(12) United States Patent
Ho

(10) Patent No.: US 11,585,552 B2
(45) Date of Patent: *Feb. 21, 2023

(54) HVAC CONTROL DURING DEMAND RESPONSE EVENT

(71) Applicant: Lennox Industries Inc., Richardson, TX (US)

(72) Inventor: Nguyen Trong Ho, Highland Village, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,479

(22) Filed: Dec. 22, 2021

(65) Prior Publication Data

US 2022/0113047 A1 Apr. 14, 2022

Related U.S. Application Data

(63) Continuation of application No. 16/735,256, filed on Jan. 6, 2020, now Pat. No. 11,255,562.

(51) Int. Cl.
| | | |
|---|---|---|
| *F24F 11/47* | (2018.01) | |
| *F24F 11/64* | (2018.01) | |
| *F24F 11/65* | (2018.01) | |
| *G05B 13/02* | (2006.01) | |
| *F24F 11/61* | (2018.01) | |
| *F24F 11/72* | (2018.01) | |
| *F24F 11/86* | (2018.01) | |
| *F24F 120/20* | (2018.01) | |
| *F24F 140/50* | (2018.01) | |

(Continued)

(52) U.S. Cl.
CPC .............. *F24F 11/47* (2018.01); *F24F 11/61* (2018.01); *F24F 11/64* (2018.01); *F24F 11/65* (2018.01); *F24F 11/72* (2018.01); *F24F 11/86* (2018.01); *G05B 13/024* (2013.01); *F24F 2110/10* (2018.01); *F24F 2120/12* (2018.01); *F24F 2120/20* (2018.01); *F24F 2140/50* (2018.01); *F24F 2140/60* (2018.01)

(58) Field of Classification Search
CPC .. F24F 11/47; F24F 11/64; F24F 11/61; F24F 11/86; F24F 11/72; F24F 11/65; F24F 2120/12; F24F 2120/20; F24F 2140/60; F24F 2140/50; F24F 2110/10; G05B 13/024
USPC ....................................................... 700/278
See application file for complete search history.

(56) References Cited

U.S. PATENT DOCUMENTS 9,447,985 B2 9/2016 Johnson, Jr.
10,871,756 B2 12/2020 Johnson, Jr. et al.
(Continued)

FOREIGN PATENT DOCUMENTS

CA 3043996 A1 2/2018

OTHER PUBLICATIONS

Johnson, Jr. David, Letter re Duty of Disclosure of Prior Art Material to Patentability dated Oct. 18, 2022.

*Primary Examiner* — Jigneshkumar C Patel
(74) *Attorney, Agent, or Firm* — Baker Botts L.L.P.

(57) ABSTRACT

A thermostat of an HVAC system receives active event parameters from a utility provider. The active event parameters include a start time, a stop time, and a predefined temperature setpoint for the active event, which is associated with a requirement to decrease energy consumption between the start time and the stop time. Following the start time, the thermostat adjusts a setpoint temperature of the HVAC system to the predefined setpoint temperature.

20 Claims, 4 Drawing Sheets

(51) Int. Cl.
   *F24F 140/60*     (2018.01)
   *F24F 110/10*     (2018.01)
   *F24F 120/12*     (2018.01)

(56) References Cited

U.S. PATENT DOCUMENTS 10,908,578 B2    2/2021   Johnson, Jr. et al.
   10,921,768 B2    2/2021   Johnson, Jr. et al.
   11,156,978 B2   10/2021   Johnson, Jr. et al.
   2009/0187499 A1  7/2009   Mulder et al.
   2014/0115340 A1  4/2014   Lee
   2014/0277761 A1  9/2014   Matsuoka et al.
   2014/0277795 A1  9/2014   Matsuoka et al.
   2015/0005974 A1  1/2015   Milenkovic et al.
   2018/0100661 A1  4/2018   Zhang
   2019/0279895 A1  9/2019   Lottes
   2021/0207835 A1  7/2021   Ho
   2021/0356927 A1 11/2021   Johnson, Jr.

HVAC CONTROL DURING DEMAND RESPONSE EVENT

CROSS-REFERENCE TO RELATED APPLICATIONS

This application is a continuation of U.S. patent application Ser. No. 16/735,256 filed Jan. 6, 2020, by Nguyen Trong Ho, and entitled "HVAC CONTROL DURING DEMAND RESPONSE EVENT," which is incorporated herein by reference.

TECHNICAL FIELD

The present disclosure relates generally to heating, ventilation, and air conditioning (HVAC) systems and methods of their use. In certain embodiments, the present disclosure relates to HVAC control during demand response events.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY OF THE DISCLOSURE

In an embodiment, a system includes an HVAC system and a thermostat communicatively coupled to the HVAC system. The thermostat receives active event parameters from a utility provider. The active event parameters include a start time for an active event, a stop time for the active event, and a predefined temperature setpoint for the active event. The active event is associated with a requirement to decrease energy consumption by the HVAC system between the start time and the stop time. Following the start time, the thermostat adjusts a setpoint temperature associated with the HVAC system to the predefined setpoint temperature. After adjusting the setpoint temperature to the predefined setpoint temperature, the thermostat receives a new user setting for operation of the HVAC system. The thermostat determines that energy consumed during operation of the HVAC system according to the new user setting is less than or equal to energy consumed during operation of the HVAC system according to the predefined setpoint temperature. In response to making this determination, the thermostat causes the HVAC system to operate according to the new user settings.

In some cases, a utility provider or other entity may request that an HVAC system be operated according to restricted operating requirements (e.g., an adjusted temperature setpoint) to reduce power consumption during times when demand is projected to outpace supply (e.g., during extreme temperature events, when utility infrastructure is disabled, or the like). Such times may be referred to as an "active event" or a "demand response time." For example, a utility provider may suggest, or enforce, certain operating restrictions upon HVAC systems during an active event in order to decrease the power consumed by these HVAC systems and ensure power can be provided to all customers. An active event may correspond, for example, to a time period associated with high outdoor temperatures or any other time when electrical power consumption is expected (e.g., based on a forecast or projection) to be increased. Generally, the third party (e.g., a utility provider) provides instructions specifying operational requirements such as a setpoint temperature or a reduction in power consumption at which an HVAC system should operate during an active event. These instructions may be transmitted to a thermostat of the HVAC system to implement operational changes associated with the active event.

The unconventional system contemplated in this disclosure solves problems of previous systems by facilitating improved human comfort and flexibility during an active event. The present disclosure encompasses the recognition that certain user requested settings of an HVAC system may be more efficient even if they are outside the operating parameters of an active event. For example, the thermostat described in this disclosure provides for parameters of an active event to be over-ridden if a user requests operational settings that when implemented by the HVAC system are at least as economical as the parameters of the active event. For instance, if a user requests to turn off cooling or increase a setpoint temperature during an active event associated with limiting energy expended cooling a space, the unique thermostat of this disclosure may allow these operations. Previous HVAC control requires an active event to be followed even when a user may prefer settings that would be less energy-consuming than those prescribed during an active event. The systems and methods described in this disclosure may be integrated into a practical application for improving the performance of HVAC systems during active events by providing enhanced user control during active events.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

As described above, prior to the present disclosure, there was a lack of tools for effectively controlling an HVAC system during active events. This disclosure encompasses the unique recognition that certain user-requested settings may provide the same or greater energy savings even if these requested settings are outside those prescribed for an active event. For example, turning off cooling to a portion of the space (e.g., a zone) being conditioned by an HVAC system may be more efficient than cooling this portion of the space at a temperature setpoint prescribed for an active event. As another example, increasing the setpoint temperature may be more efficient than operating an HVAC system in a cooling mode at a lower setpoint prescribed for an active event

Example System for Operating HVAC System According to an Active Event

Figure 1:
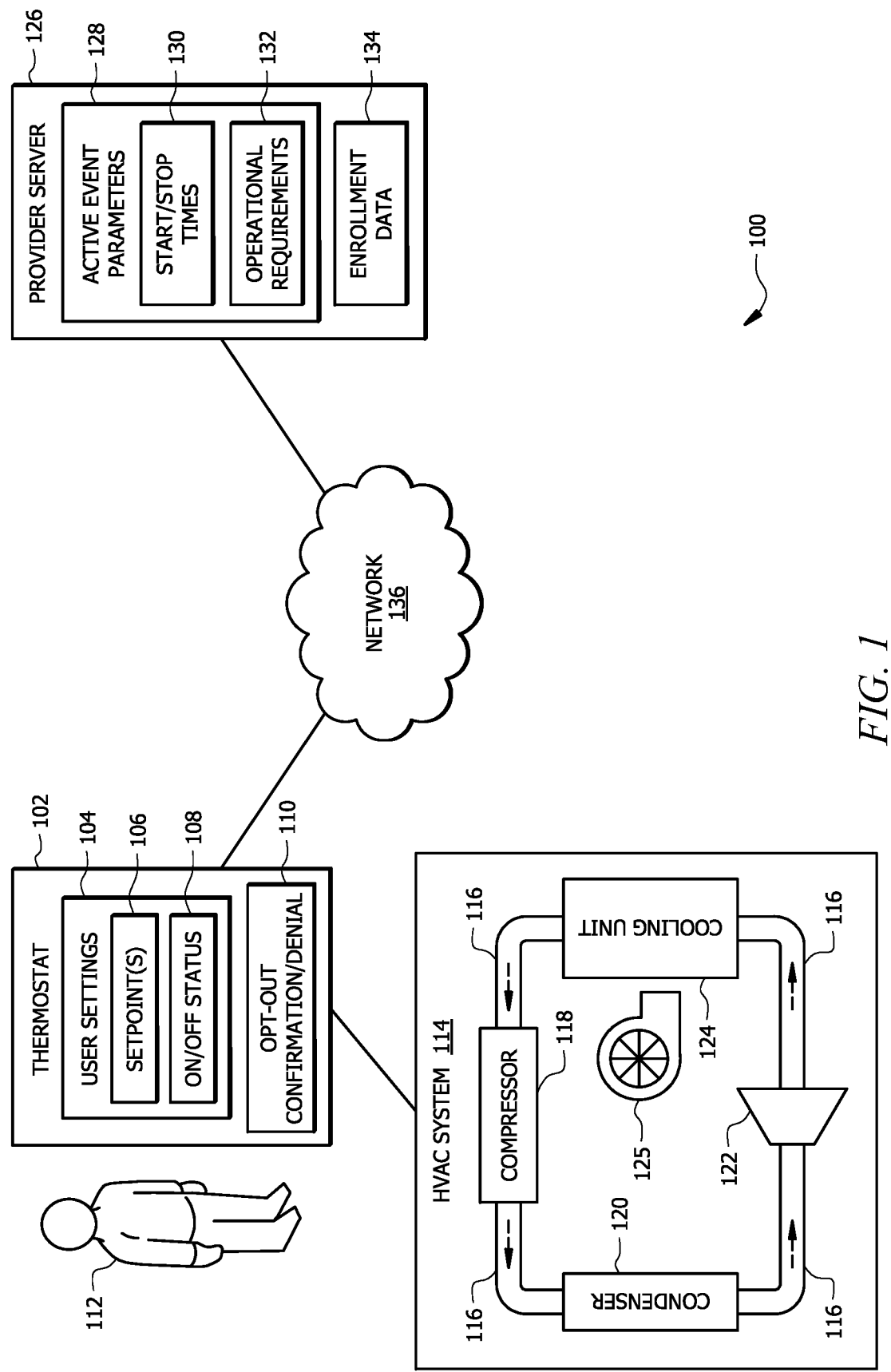
FIG. 1 is a diagram of an example system configured for operating an HVAC system during an active event.

FIG. 1 is a schematic diagram of an example system 100 configured for operation according to an active event. The system 100 includes a thermostat 102, an HVAC system 114, a provider server 126, and a network 136. The thermostat 102 is generally configured to provide user settings 104, such as one or more temperature setpoints 106 and one or more on/off status(es) 108 to the HVAC system 114. For instance, the user settings may be used by the HVAC system 114 to control operation of the system's components, such as the compressor 118. The thermostat 102 is communicatively coupled (e.g., via network 136, as shown in the example of FIG. 1) to the provider 126. If the thermostat 102 is participating in an active event, the thermostat 102 causes the HVAC system 114 to be operated according to the generally more energy-efficient (e.g., less energy-consuming) active event parameters 128 specified by the provider 126. These active event parameters 128 include operational requirements 132, which may indicate a predefined temperature setpoint (e.g., an increased temperature setpoint if the active event is associated with decreasing energy consumption during cooling) at which to operate the HVAC system 114 during the active event. Once the HVAC system 114 is operating according to the active event, the thermostat 102 is configured to receive updated user settings 104 and determines whether operating the HVAC system 114 according to the updated settings 104 are at least as energy efficient as operating the HVAC system 114 according to the active event parameters 128 specified by the provider 126. If this is the case (e.g., if a new user setpoint temperature 106 is greater than the predefined setpoint temperature of the active event parameters 128), the HVAC system 114 is caused to operate according to the new user settings 104. Otherwise, the new settings 104 may be ignored. In some cases, the thermostat 102 may provide for entry of an opt-out confirmation/denial 110 to determine (e.g., via confirmation or denial) whether the user 112 wishes to opt-out of a given active event and operate the HVAC system 114 at less efficient (e.g., more energy-consuming) settings 104.

The thermostat 102 is generally in signal communication with the HVAC system 114 (e.g., to one or more controllers of the HVAC system 114) using any suitable type of wired or wireless connection. The thermostat 102 may be a single-stage thermostat, a multi-stage thermostat or any suitable type of thermostat. The thermostat 102 is configured to allow a user to input desired settings 104 such as one or more temperature setpoints 106 of a space conditioned by the HVAC system 114 for one or more zones such as a room in the conditioned space. The on/off status 108 generally corresponds to an indication of whether the HVAC system as a whole is powered on or off and/or if certain components (e.g., one or more compressors 118 or blowers 125) of the HVAC system 114 are turned on or off. The on/off status 108 may include an indication of whether conditioned air is supplied to a zone or portion of the conditioned space by the HVAC system 114.

The thermostat 102 may include a user interface for controlling and displaying information related to the operation and/or status of the HVAC system 114. For example, the user interface may provide for input of user settings 104 and display of any alerts and/or messages related to the status and/or operation of the HVAC system 114. In addition to the setpoints 106 and the on/off status 108, the user interface may display operational, diagnostic, and/or other status messages and provide a visual interface that allows the user 112, an installer, a support entity, and/or a service provider to perform actions with respect to the HVAC system 114 (e.g., for diagnostics and/or maintenance). In some embodiments, the thermostat 102 may receive information (e.g., for providing user settings 104 and/or entry of confirmation/denial 110) from another device (e.g., via an application on a smartphone device, e.g., from a home automation tool).

The HVAC system 114 generally conditions air for delivery to at least one conditioned space. The conditioned space may be, for example, a room, a house, an office building, a warehouse, or the like. In some embodiments, the HVAC system 114 is a rooftop unit (RTU) that is positioned on the roof of a building and the conditioned air is delivered to the interior of the building. In other embodiments, portion(s) of the system may be located within the building and portion(s) outside the building. The HVAC system may include one or more heating elements (not shown for convenience and clarity). The HVAC system 114 may be configured as shown in FIG. 1 or in any other suitable configuration. For example, the HVAC system 114 may include additional components or may omit one or more components shown in FIG. 1. The HVAC system 114 may be or include a heat pump.

The example HVAC system 114 includes a conduit subsystem 116, at least one compressor 118, at least one condenser 120, an expansion valve 122, and at least one cooling unit 124. The HVAC system 100 is communicatively coupled to the thermostat 102. The HVAC system 114 may include one or more controllers (not shown for conciseness and clarity) for communicating with and implementing operational instructions provided by the thermostat 102. In some embodiments, the thermostat 102 includes the controller of the HVAC system 114

The conduit subsystem 116 facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The compressor 118 is coupled to the conduit subsystem 116 and compresses (i.e., increases the pressure of) the working fluid. The compressor 118 may be a single-stage, variable-speed, or multi-stage compressor. A single-stage compressor generally operates at a single compressor speed. A variable-speed compressor is generally configured to operate at different speeds to increase the pressure of the working fluid to keep the working fluid moving along the conduit subsystem 116. A multi-stage compressor may include multiple compressors, each configured to operate at a constant speed to increase the pressure of the working fluid.

The condenser 120 is configured to facilitate movement of the working fluid through the conduit subsystem 116. The condenser 120 is generally located downstream of the compressor 118 and is configured to remove heat from the working fluid. A fan may be configured to move air across the condenser 120. For example, a fan may be configured to blow outside air through the condenser 120 to help cool the working fluid flowing therethrough. The compressed, cooled working fluid flows from the condenser 120 toward an expansion device 122.

The expansion device 122 may be a valve such as an expansion valve or a flow control valve (e.g., a thermostatic expansion valve valve) or any other suitable valve for removing pressure from the working fluid while, optionally, providing control of the rate of flow of the working fluid. The expansion device 122 may be in communication with the thermostat 102 and/or one or more controllers of the HVAC system 114 (e.g., via wired and/or wireless communication) to receive control signals for opening and/or closing associated valves and/or provide flow measurement signals corresponding to the rate of working fluid flow through the working fluid subsystem 102. The expansion device 122 is coupled to the conduit subsystem 116 downstream of the condenser 118 and is configured to remove pressure from the working fluid. In this way, the working fluid is delivered to the cooling unit 124 and receives heat from an airflow to produce a conditioned airflow that is delivered (e.g., by a duct subsystem) to the conditioned space.

The cooling unit 124 is generally any heat exchanger configured to provide heat transfer between air flowing through the cooling unit 124 (i.e., air contacting an outer surface of one or more coils of the cooling unit 124) and working fluid passing through the interior of the cooling unit 124. For example, the cooling unit 124 may be or include an evaporator coil. The cooling unit 124 is fluidically connected to the compressor 118, such that working fluid generally flows from the cooling unit 124 to the compressor 118. A portion of the HVAC system 114 is generally configured to move air across the cooling unit 124 to generate a conditioned airflow, which is provided to the conditioned space.

A blower 125 may provide a flow of air across the cooling unit 124. The blower 125 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower. Such a blower 125 may be in signal communication with the thermostat 102 and/or one or more controllers of the HVAC system 114 using any suitable type of wired or wireless connection in order to control operation of the blower 125.

The HVAC system 114 may include one or more sensors (not shown for clarity and conciseness) in signal communication with thermostat 102 and/or one or more controllers of the HVAC system 114. Such sensors may include any suitable type of sensor for measuring air temperature, relative humidity, and/or any other properties of a conditioned space (e.g. a zone, room, or building) and/or of a surrounding environment (e.g., an outdoor space).

The provider server 126 is generally any computing device, or collection of two or more computing devices (e.g., each with a memory, processor, and interface the same or similar to those illustrated for the device of FIG. 4 below). The provider server 126 is configured to store active event parameters 128 and enrollment data 134. The active event parameters 128 include start and stop times 130 during which certain operating requirements should or must be enforced upon the HVAC system 114. The time interval associated with start and stop times 130 may correspond to a peak demand response time (e.g., a time during which demand is expected to be high and electrical power consumption should be decreased). The active event parameters 128 also include operational requirements 132, which may include a predefined setpoint temperature (i.e., a value at which the temperature setpoint 106 must be set during the active event), a predefined setpoint temperature offset (i.e., an amount by which the current temperature setpoint 106 must be increased or decreased during the active event), an amount (e.g., a percentage) by which the HVAC system 114 must decrease its power consumption during the active event, an amount of power that can be consumed by the HVAC system 114 during the active event, or the like. In general, the active event parameters 128 may include any appropriate instructions associated with decreasing power consumption by the HVAC system 114 during the active event. The provider server 126 may be operated by a utility provider or any other entity with administrative privileges over operation of the HVAC system 114. For example, the provider server 126 may include enrollment data which associates the thermostat 102 (e.g., based on its known geographical location) to appropriate active event parameters (e.g., parameters specific to the geographical location of the thermostat 102).

The provider server 126 may be configured to identify appropriate active event parameters to provide to a given thermostat 102 such that the thermostat 102 can cause the HVAC system 114 to operate according to the operational requirements 132 during an active event (e.g., such that an active event associated with a given geographical region are provided only to thermostats in this region). The thermostat 102 is generally configured to receive active event parameters 128 from the provider 126 (e.g., a utility provider or any other appropriate entity). Generally, the thermostat 102 is configured to receive and interpret the active event parameters 128 and to appropriately adjust operation of the HVAC system 114 to satisfy operational requirements 132 associated with the active event.

As described above, in certain embodiments, connections between the thermostat 102 and the HVAC system 114 are wired. For example, conventional cable and contacts may be used to couple the thermostat 102 to one or more components of the HVAC system 114 (e.g., compressor 118 and/or one or more controllers of the HVAC system 114). In some embodiments, a wireless connection is employed to provide at least some of the connections between the thermostat 102 and components of the HVAC system 114. In some embodiments, a data bus couples the thermostat 102 and various components of the HVAC system 114 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 114 to each other and/or the thermostat 102 to one or more of these components. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate.

Figure 2:
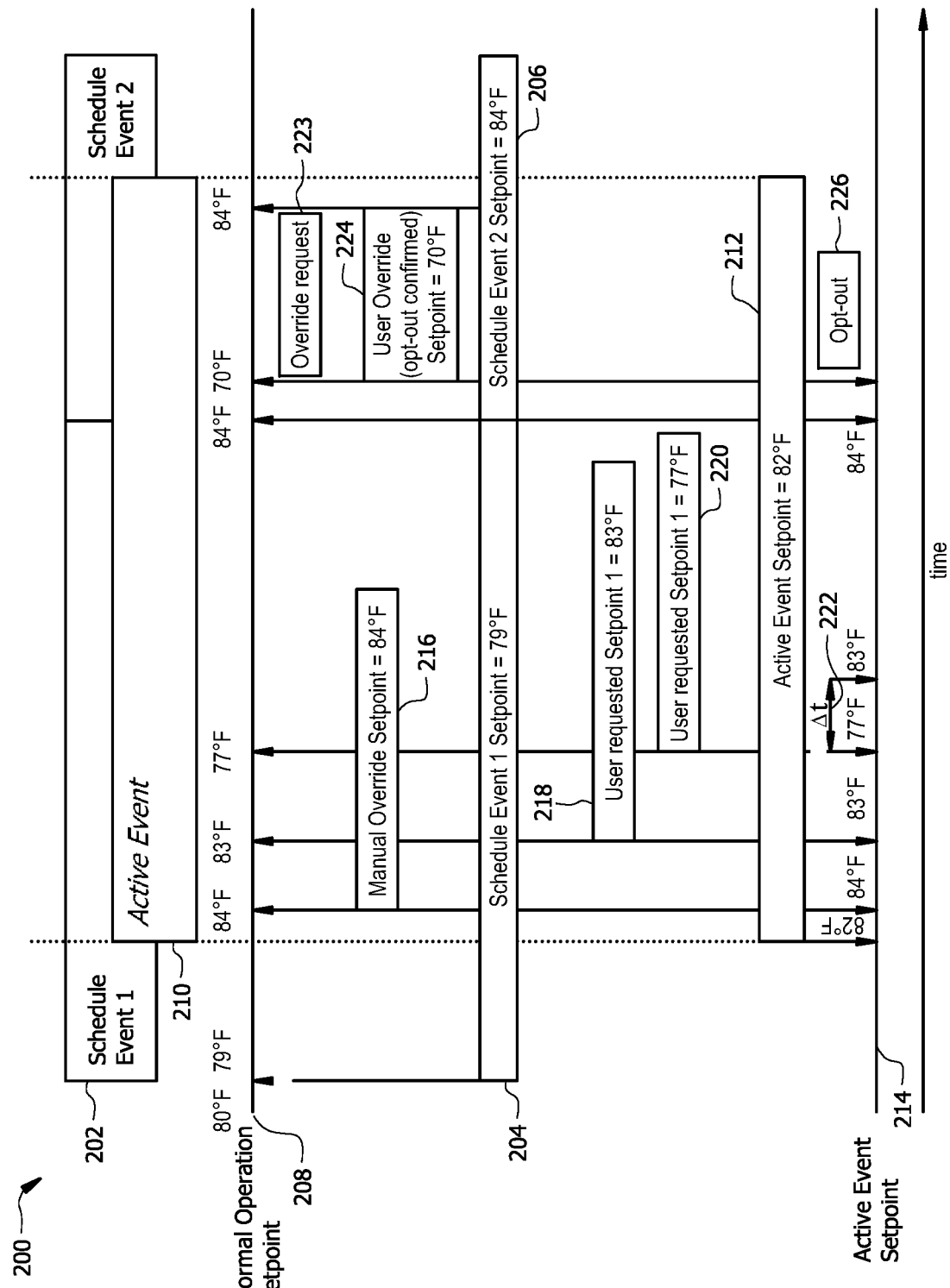
FIG. 2 is a diagram illustrating an example operation of a thermostat according to an active event.

FIG. 2 is a diagram 200 illustrating an example operation of thermostat 102 based on active event parameters 128 from provider 126. In this example, the HVAC system 114 starts up to provide cooling to an enclosed space based on an event schedule 202 associated with the thermostat 102. The example event schedule 202 includes a first scheduled event during an initial period of time and a second scheduled event during a subsequent period of time. The schedule 202 generally reflects user settings 104 which have been preconfigured by the user 112. As an example, the first scheduled event may correspond to a time when people are expected to occupy a space conditioned by the HVAC system 114, and the second scheduled event may correspond to a time when people are not expected to occupy the conditioned space (e.g., and less cooling is needed). In this example, the first scheduled event of the event schedule 202 is associated with a first scheduled setpoint temperature 204 of 79° F., and the second scheduled event of the event schedule 202 is associated with a second scheduled setpoint temperature 206 of 84° F.

Once the first scheduled event begins, the thermostat 102 operates according to a normal operation setpoint 208. For instance, at the start of the event schedule 202, the normal operating setpoint 208 of the thermostat 102 is adjusted to the first scheduled setpoint temperature 204 of 79° F. This may involve causing the compressor 118 to turn on or be adjusted to a modified speed to cause the HVAC system 114 to adjust the temperature in the conditioned space toward the setpoint temperature 204 of 79° F.

In the example of FIG. 2, active event parameters 128 from the provider 126 indicate that there is an active event 210 during a portion of the time of the event schedule 202. The time interval of the active event 210 may be determined based on the start/stop times 130 of the active event parameters 128. In this example, the active event 210 is associated with a corresponding active event setpoint temperature 212 of 82° F. The active event setpoint temperature 212 is generally an operational requirement 132 of the active event parameters 128 (see FIG. 1). At the start of the active event 210, the thermostat 102 changes to the active event setpoint 214 such that the thermostat 102 causes the HVAC system 114 to operate according to the active event setpoint temperature 212 of 82° F.

At a time following the start of the active event 210, a manual override request 223 is received by the thermostat 102 to increase the current setpoint temperature to an override temperature setpoint 216 of 84° F. The thermostat 102 determines whether operation of the HVAC system 114 according to the override temperature setpoint 216 is at least as energy efficient as operation of the HVAC system 114 at the active event setpoint temperature 212. In this example, the thermostat 102 determines that, since the HVAC system 114 is operating in a cooling mode, operating the HVAC system 114 at the higher override setpoint temperature 216 of 84° F. would be less energy-consuming than operating the HVAC system 114 at the lower active event setpoint 212 of 82° F. (i.e., because less energy is consumed to cool air to the higher setpoint 216). In response to this determination, the thermostat 102 causes the HVAC system 114 to operate according to the override setpoint temperature 216 of 84° F.

At a time during the manual override, the user 112 requests a new setpoint temperature 218 of 83° F. This new setpoint temperature 218 of 83° F. is less than the current override setpoint temperature 216 of 84° F. However, the thermostat 102 still determines that the new setpoint temperature 218 is acceptable because operating the HVAC system 114 at the new setpoint temperature 218 is less energy consuming than operating the HVAC system 114 at the active event setpoint temperature 212 of 82° F. Accordingly, the thermostat 102 causes the HVAC system 114 to operate according to the new setpoint temperature 218, as illustrated in FIG. 2.

At a time during the newly requested setpoint 218, the user 112 requests an alternative setpoint temperature 220 of 77° F. In some embodiments, this newly requested setpoint temperature 220 may be rejected by the thermostat 102 because operating at this decreased setpoint temperature 220 will consume more energy than operating at the active event setpoint temperature 212 of 82° F. In some embodiments, as illustrated in the example of FIG. 2, the thermostat 102 is configured to allow brief override of the setpoint temperature even when the requested setpoint temperature 220 will consume more energy. As shown in FIG. 2, the alternative setpoint temperature 220 may be accepted for a brief time interval 222 (e.g., of about 5 minutes) before the thermostat 102 is adjusted back to the previously requested setpoint temperature 218 of 83° F. This feature may improve compatibility between the thermostat 102 and other third party devices and/or software, such as home automation kits which may require that requests be at least temporarily accepted by the thermostat 102 in order to maintain proper function (e.g., without displaying error messages, bombarding the thermostat 102 with repeated requests, etc.).

At the start time of the second event of the event schedule 202, the thermostat 102 determines whether the second scheduled setpoint temperature 206 of 84° F. is acceptable during the active event 210. In this example, the second scheduled setpoint temperature 206 of 84° F. is greater than the active event setpoint temperature of 82° F., and, therefore, the thermostat 102 causes the HVAC system 114 to operate according to the scheduled setpoint temperature 206 of 84° F.

During the second event of the event schedule 202, the user 112 requests to override the current temperature setpoint to a setpoint temperature 224 of 70° F. For example, the user 112, who usually would not occupy the space during the second event, may have returned and requires a lower temperature for comfort. In response to this request, the thermostat 102 may request an opt-out confirmation/denial 110 (see FIG. 1) from the user 112 in order to determine whether the user 112 wishes to opt-out of the active event 210. For instance, a message may be displayed on a display of the thermostat 102 (and/or on another device of the user 112) requesting that the user 112 confirm or deny opting out of the active event 210. Opting out of the active event 210 may cause the user 112 to forfeit any financial incentives associated with participating in the active event 210 (e.g., a decrease in energy cost during the active event 210). Following receipt of user confirmation 110 to opt-out, the thermostat 102 may cause the HVAC system 114 to operate according to the setpoint temperature 224. However, following receipt of user denial, the thermostat 102 causes the HVAC system 114 to continue to operate according to the previous setpoint temperature 206 of the event schedule 202. In some cases, the thermostat 102 may determine that the response to the request for opt-out confirmation/denial 110 is not received within a threshold time. If this is the case, the thermostat 102 may ignore the setpoint temperature 224 and continue causing the HVAC system 114 to operate according to previous setpoint temperature 206. If the user 112 confirms that opting out of the active event 210 is desired, the thermostat 102 may send an opt-out message 226 to the provider 126 indicating that the HVAC system 114 is no longer following instructions (e.g., active event parameters 128) associated with the active event 210.

In some cases, the user 112 may request to stop conditioning to a zone of the space conditioned by the HVAC system 114. For instance, user 112 may wish to stop cooling a portion of the space (e.g., a temporary workspace, spare bedroom, or the like) when it is no longer occupied or in use. The thermostat 102 generally permits such a request because stopping conditioning to a zone or portion of the conditioned space will reduce energy consumption irrespective of the current temperature setpoint. In some cases, the user 112 may request to turn off one or more of the compressors 118 of the HVAC system 114. In general, the thermostat 102 will generally permit such requests because turning off a compressor 118 will reduce energy consumption irrespective of a temperature setpoint.

Example Thermostat Operation According to an Active Event

Figure 3:
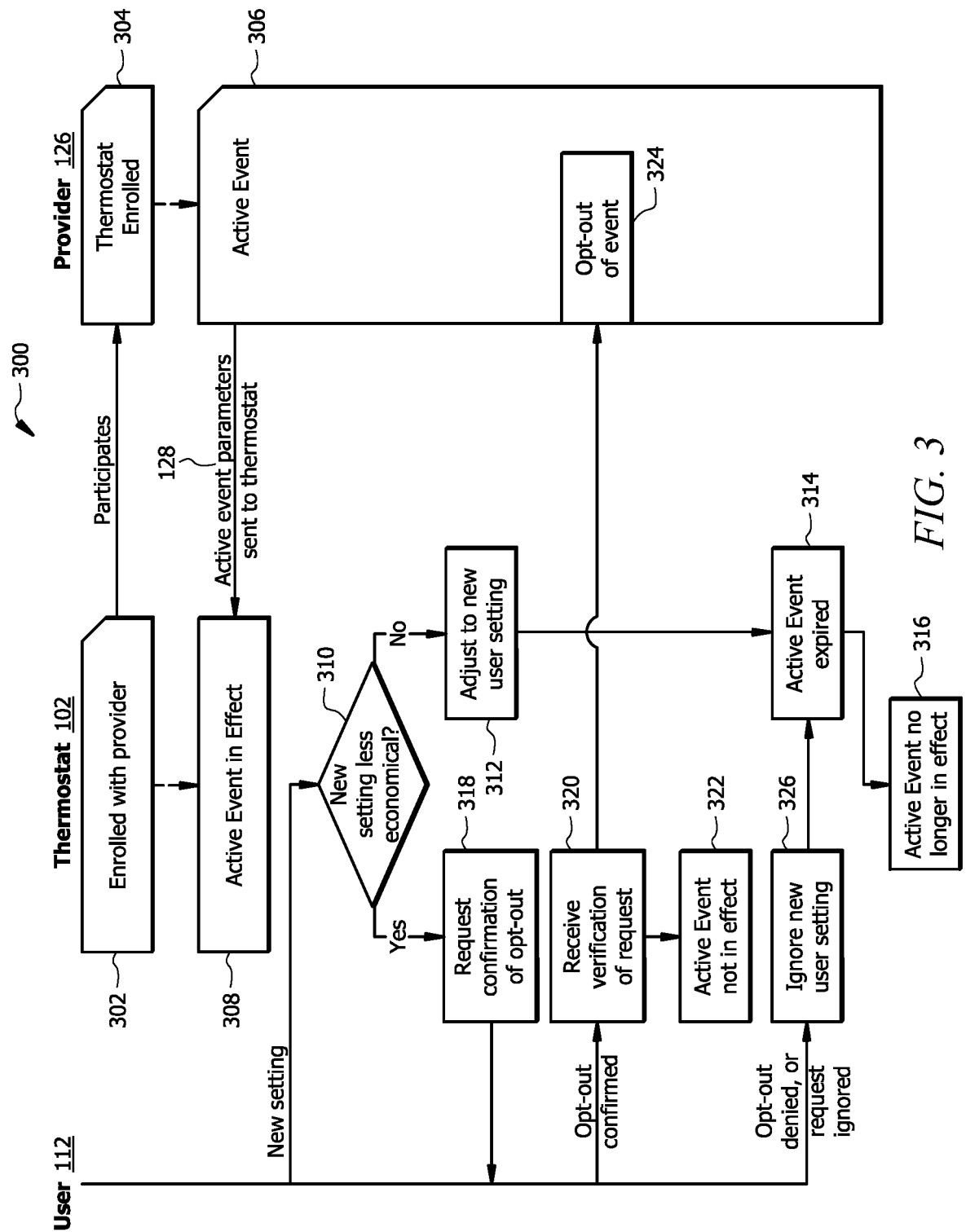
FIG. 3 is a flowchart of an example method of operating a thermostat according to an active event.

FIG. 3 is a flow diagram illustrating an example method 300 of operating the thermostat 102 of FIG. 1 according to active event parameters 128. The method 300 may begin at step 302 where the thermostat 102 is enrolled with the provider 126. For example, the thermostat 102 may be associated with the provider via enrollment data 134. For instance, an identifier of the thermostat 102 (e.g., a serial number or the like) may be included in the enrollment data 134 to indicate to the provider 126 that the thermostat 102 participates in active events. As illustrated in FIG. 3, the provider 126 may determine that the thermostat 102 is enrolled at step 304, and, prior to the start of an active event 306, active event parameters 128 are provided to the thermostat 102. The thermostat 102 receives active event parameters 128 from the provider 126. As described above, the active event 306 is generally associated with a requirement to decrease energy consumption by the HVAC system 114 between the start and stop times 130 of the active event 306.

The thermostat 102 uses the active event parameters 128 (e.g., the start/stop times 130) to determine at step 308 that an active event is in effect. Upon the active event 306 being in effect at step 308, the thermostat 102 generally causes the HVAC system to operate according to the operational requirements 132 of the active event 306. For example, the thermostat 102 may be adjusted to a predefined setpoint temperature included in the operational requirements 132 (e.g., at the setpoint temperature 212 of FIG. 2) such that the HVACV system 114 is operated according to this predefined setpoint temperature.

During the active event 306, the user 112 may provide a new user setting 104 for operation of the HVAC system 114 (e.g., a new temperature setpoint 216, 218, 220, or 224 of FIG. 2). The thermostat 102 receives the new user setting 104 and determines at step 310 whether operation of the HVAC system 114 according to the new user setting 104 is more economical (e.g., less energy consuming, more energy efficient, or the like) than operation of the HVAC system 114 at the operational requirements 132 associated with the active event 306. For instance, if the new user setting 104 is a new setpoint temperature and the active event 306 is associated with instructions to decrease energy consumption during cooling (e.g., during operation of the HVAC system 114 in a cooling mode), the thermostat 102 may determine that operation of the HVAC system 114 according to the new user setting 104 is allowed by determining that the new setpoint temperature is greater than a predefined setpoint temperature associated with the active event 306.

As another example, if the new user setting 104 corresponds to turning off a compressor 118 of the HVAC system 114, the thermostat 102 may determine that operation of the HVAC system 114 according to the new user setting 104 is allowed by determining that energy consumption is decreased by turning off the compressor 118. As yet another example, if the new user setting 104 corresponds to ceasing to condition air in at least a portion the space conditioned by the HVAC system 114, the thermostat 102 may determine that operation of the HVAC system 114 according to the new user setting 104 is allowed by determining that energy consumption is decreased by stopping conditioning of air in this portion of the space.

If, at step 310, operation of the HVAC system 114 according to the new user setting 104 is determined to not be more energy-consuming than operation of the HVAC system 114 according to the operational requirements 132 of the active event 306 (e.g., a predefined setpoint temperature of the active event 306), the thermostat 102 follows the path indicated as "no" and generally causes the HVAC system 114 to operate according to the new user setting 104 (e.g., at the new setpoint temperature, or the like). In this way, the user 112 can achieve a preferred setting 104 (e.g., for improved comfort) while the requisite energy savings of the active event 306 are still maintained. The HVAC system 114 is operated according to the new setting 104 at least until the active event 306 expires at step 314 (e.g., based on the stop time 130) and the active event 306 is no longer in effect at step 324.

If, at step 310, operation of the HVAC system 114 according to the new user setting 104 is determined to be less economical than operation of the HVAC system 114 according to the operational requirements 132 of the active event 306 (e.g., a predefined setpoint temperature of the active event 306), the thermostat 102 follows the path indicated as "yes" and may request confirmation that the user 112 wishes to opt-out of the active event 306. If opt-out is confirmed by the user 112, the thermostat 102 receives the opt-out confirmation 110 at step 320, and the active event 306 is no longer in effect at step 322. With the active event 306 no longer in effect, the thermostat 102 causes the HVAC system 114 to operate according to the new user setting 104 (e.g., a new temperature setpoint 106). If opt-out confirmation is received at step 320, the thermostat 102 may send an opt-out message 324 to the provider 126. The opt-out message 324 may include an indication that the HVAC system 114, or the corresponding thermostat 102, is not following the active event parameters 128 associated with the active event 306.

Otherwise, if opt-out is denied by the user 112 (e.g., or the user 112 fails to respond to the request from step 318 within a threshold time interval), the thermostat 102 ignores the new user setting 104 at step 326. and the thermostat 102 causes the HVAC system 114 to continue operating according to the operational requirements 132 of the active event 306 (e.g., according to a predefined setpoint temperature of the operational requirements 132). After the active event 306 expires at step 314, the active event 306 is no longer in effect at step 316. Once the active event 306 is no longer in effect, the thermostat 102 may allow the HVAC system 114 to operate according to the new user setting 104 (e.g., a new temperature setpoint 106).

Modifications, additions, or omissions may be made to method 300 depicted in FIG. 3. Method 300 may include more, fewer, or other steps. For example, steps may be performed in parallel or in any suitable order. While at times discussed as thermostat 102, or components thereof performing the steps, any suitable components of the HVAC system 114, such as a controller of the HVAC system 114, may perform one or more steps of the method 300.

Example Thermostat Device

Figure 4:
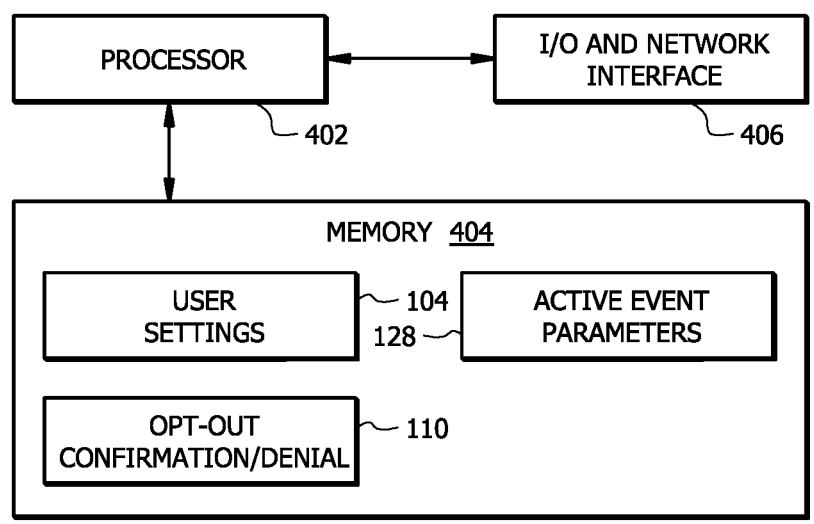
FIG. 4 is a diagram of an example thermostat of the system of FIG. 1.

FIG. 4 is a schematic diagram of an example thermostat 102. The thermostat 102 includes a processor 402, a memory 404, and an input/output (I/O) and network interface 406.

The processor 402 includes one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 404 and may control the operation of HVAC system 114. The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory 404 and executes them by directing the coordinated operations of the ALU, registers, and other components. The processor may include other hardware and software that operates to process information, control the HVAC system 114, and perform any of the functions described herein (e.g., with respect to FIGS. 1-3). The processor 402 is not limited to a single processing device and may encompass multiple processing devices. Similarly, the thermostat 102 is not limited to a single thermostat but may encompass multiple thermostats.

The memory 404 includes one or more disks, tape drives, or solid-state drives, and may be used as an over-flow data storage device, to store programs when such programs are selected for execution, and to store instructions and data that are read during program execution. The memory 404 may be volatile or non-volatile and may include ROM, RAM, ternary content-addressable memory (TCAM), dynamic random-access memory (DRAM), and static random-access memory (SRAM). The memory 404 is operable to store the user settings 104, opt-out confirmation or denial 110, and active event properties 128 received from the provider 126.

The interface 406 is configured to communicate data and signals with other devices. For example, the interface 406 may be configured to communicate electrical signals with components of the HVAC system 114 including the compressor 118, the expansion valve 122, the blower 125 of the HVAC system 114, sensors of the HVAC system 114, and any controllers of the HVAC system. The interface may provide and/or receive, for example, compressor speed signals, blower speed signals, temperature signals, relative humidity signals, user settings 104, temperature setpoints 106, on/off status 108, environmental conditions, and an operating mode status for the HVAC system 114 and send electrical signals to the components of the HVAC system 114. The interface 406 may include ports or terminals for establishing signal communications between the thermostat 102 and other devices. The interface 406 may be configured to enable wired and/or wireless communications. The interface 406 is configured to enable wired and/or wireless communications (e.g., via network 136 of FIG. 1). The interface 406 is configured to communicate data between the thermostat 102 and other network devices, systems, or domain(s). For example, the interface 406 may include a WIFI interface, a local area network (LAN) interface, a wide area network (WAN) interface, a modem, a switch, or a router (e.g., for communicating via network 136 of FIG. 1). The processor 402 is configured to send and receive data using the interface 406. The interface 406 may be configured to use any suitable type of communication protocol.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
  a heating, ventilation, and air conditioning (HVAC) system; and
  a thermostat communicatively coupled to the HVAC system and a utility provider, the thermostat configured to:
    receive, via a network, active event parameters from the utility provider, the active event parameters comprising a start time for an active event, a stop time for the active event, and a predefined temperature setpoint for the active event, wherein the active event is associated with a requirement to decrease energy consumption by the HVAC system between the start time and the stop time during operation of the HVAC system in a cooling mode;
    following the start time, adjust a setpoint temperature associated with the HVAC system to the predefined setpoint temperature;
    receive a user request to operate the HVAC system at a second setpoint temperature, wherein the second temperature is less than the predefined temperature setpoint of the active event;
    cause the HVAC system to temporarily operate according to the second temperature setpoint for a time interval, wherein the time interval is within an active event time from the start time and stop time of the active event and less than the active event time; and
    after completion of the time interval, cause the HVAC system to revert to operating according to the predefined temperature setpoint of the active event.

2. The system of claim 1, wherein:
  the thermostat is further configured to receive a new user setting that comprises a new setpoint temperature; and
  the thermostat is further configured to determine that energy consumed during operation of the HVAC system according to the new user setting is less than or equal to energy consumed during operation of the HVAC system according to the predefined setpoint temperature by determining that the new setpoint temperature is greater than the predefined setpoint temperature.

3. The system of claim 1, wherein:
the thermostat is further configured to receive a new user setting that comprises a setting to turn off a compressor of the HVAC system; and
the thermostat is further configured to determine that energy consumed during operation of the HVAC system according to the new user setting is less than or equal to energy consumed during operation of the HVAC system according to the predefined setpoint temperature by determining that energy consumption is decreased by turning off the compressor.

4. The system of claim 1, wherein:
the thermostat is further configured to receive a new user setting that comprises a setting to stop conditioning of air in at least a portion of a space conditioned by the HVAC system; and
the thermostat is further configured to determine that energy consumed during operation of the HVAC system according to the new user setting is less than or equal to energy consumed during operation of the HVAC system according to the predefined setpoint temperature by determining that energy consumption is decreased by stopping conditioning of air in the portion of the space conditioned by the HVAC system.

5. The system of claim 1, wherein the thermostat is further configured to cause the HVAC system to temporarily operate according to the second temperature setpoint for the time interval without opting out of the active event.

6. The system of claim 1, wherein:
the thermostat is further configured to:
receive a second user request to operate the HVAC system at a second setpoint temperature, wherein the second temperature is less than the predefined temperature setpoint associated with the active event;
request user confirmation to opt-out of the active event;
determine that a response to the request for user confirmation is not received within a threshold time; and
following determining that the response to the request for user confirmation is not received within the threshold time, ignore the second user request and continue causing the HVAC system to operate according to the predefined setpoint temperature associated with the active event.

7. The system of claim 1, wherein:
the thermostat is further configured to:
receive a second user request to operate the HVAC system at a second setpoint temperature, wherein the second temperature is less than the predefined temperature setpoint associated with the active event;
request user confirmation to opt-out of the active event; and
following receipt of user confirmation, cause the HVAC system to operate according to the second setpoint temperature.

8. The system of claim 7, wherein the thermostat is further configured to send, via the network, an opt-out message to the utility provider, the opt-out message comprising an indication that the HVAC system is not participating in the active event.

9. A method for operating a thermostat of a heating, ventilation, and air conditioning (HVAC) system, the method comprising:
receiving, via a network, active event parameters from a utility provider, the active event parameters comprising a start time for an active event, a stop time for the active event, and a predefined temperature setpoint for the active event, wherein the active event is associated with a requirement to decrease energy consumption by the HVAC system between the start time and the stop time during operation of the HVAC system in a cooling mode;
following the start time, adjusting a setpoint temperature associated with the HVAC system to the predefined setpoint temperature;
receiving a user request to operate the HVAC system at a second setpoint temperature, wherein the second temperature is less than the predefined temperature setpoint of the active event;
causing the HVAC system to temporarily operate according to the second temperature setpoint for a time interval, wherein the time interval is within an active event time from the start time and stop time of the active event and less than the active event time; and
after completion of the time interval, causing the HVAC system to revert to operating according to the predefined temperature setpoint of the active event.

10. The method of claim 9, further comprising:
receiving a new user setting that comprises a new setpoint temperature; and
determining that energy consumed during operation of the HVAC system according to the new user setting is less than or equal to energy consumed during operation of the HVAC system according to the predefined setpoint temperature by determining that the new setpoint temperature is greater than the predefined setpoint temperature.

11. The method of claim 9, further comprising:
receiving a new user setting that comprises a setting to turn off a compressor of the HVAC system; and
determining that energy consumed during operation of the HVAC system according to the new user setting is less than or equal to energy consumed during operation of the HVAC system according to the predefined setpoint temperature by determining that energy consumption is decreased by turning off the compressor.

12. The method of claim 9, further comprising:
receiving a new user setting that comprises a setting to stop conditioning of air in at least a portion of a space conditioned by the HVAC system; and
determining that energy consumed during operation of the HVAC system according to the new user setting is less than or equal to energy consumed during operation of the HVAC system according to the predefined setpoint temperature by determining that energy consumption is decreased by stopping conditioning of air in the portion of the space conditioned by the HVAC system.

13. The method of claim 9, further comprising causing the HVAC system to temporarily operate according to the second temperature setpoint for the time interval without opting out of the active event.

14. The method of claim 9, further comprising:
receiving a second user request to operate the HVAC system at a second setpoint temperature, wherein the second temperature is less than the predefined temperature setpoint associated with the active event;
requesting user confirmation to opt-out of the active event; and
determining that a response to the request for user confirmation is not received within a threshold time;
following determining that the response to the request for user confirmation is not received within the threshold time, ignoring the second user request and continuing to cause the HVAC system to operate according to the predefined setpoint temperature associated with the active event.

15. The method of claim 9, further comprising:
receiving a second user request to operate the HVAC system at a second setpoint temperature, wherein the second temperature is less than the predefined temperature setpoint associated with the active event;
requesting user confirmation to opt-out of the active event; and
following receipt of user confirmation, causing the HVAC system to operate according to the second setpoint temperature.

16. The method of claim 15, further comprising sending, via the network, an opt-out message to the utility provider, the opt-out message comprising an indication that the HVAC system is not participating in the active event.

17. A thermostat of a heating, ventilation, and air conditioning (HVAC) system, the thermostat comprising:
a memory configured to store active event parameters received from a utility provider, the active event parameters comprising a start time for an active event, a stop time for the active event, and a predefined temperature setpoint for the active event, wherein the active event is associated with a requirement to decrease energy consumption by the HVAC system between the start time and the stop time during operation of the HVAC system in a cooling mode; and
a processor coupled to the memory and configured to:
following the start time, adjust a setpoint temperature associated with the HVAC system to the predefined setpoint temperature;
receive a user request to operate the HVAC system at a second setpoint temperature, wherein the second temperature is less than the predefined temperature setpoint of the active event;
cause the HVAC system to temporarily operate according to the second temperature setpoint for a time interval, wherein the time interval is within an active event time from the start time and stop time of the active event and less than the active event time; and
after completion of the time interval, cause the HVAC system to revert to operating according to the predefined temperature setpoint of the active event.

18. The thermostat of claim 17, wherein:
the processor is further configured to receive a new user setting that comprises a new setpoint temperature; and
the processor is further configured to determine that energy consumed during operation of the HVAC system according to the new user setting is less than or equal to energy consumed during operation of the HVAC system according to the predefined setpoint temperature by determining that the new setpoint temperature is greater than the predefined setpoint temperature.

19. The thermostat of claim 17, wherein:
the processor is further configured to receive a new user setting that comprises a setting to turn off a compressor of the HVAC system; and
the processor is further configured to determine that energy consumed during operation of the HVAC system according to the new user setting is less than or equal to energy consumed during operation of the HVAC system according to the predefined setpoint temperature by determining that energy consumption is decreased by turning off the compressor.

20. The thermostat of claim 17, wherein the thermostat is further configured to cause the HVAC system to temporarily operate according to the second temperature setpoint for the time interval without opting out of the active event.

* * * * *